A. C. PETERSON.
PACKING PAD MACHINE.
APPLICATION FILED FEB. 19, 1909.
951,840.
Patented Mar. 15, 1910.
6 SHEETS—SHEET 6.
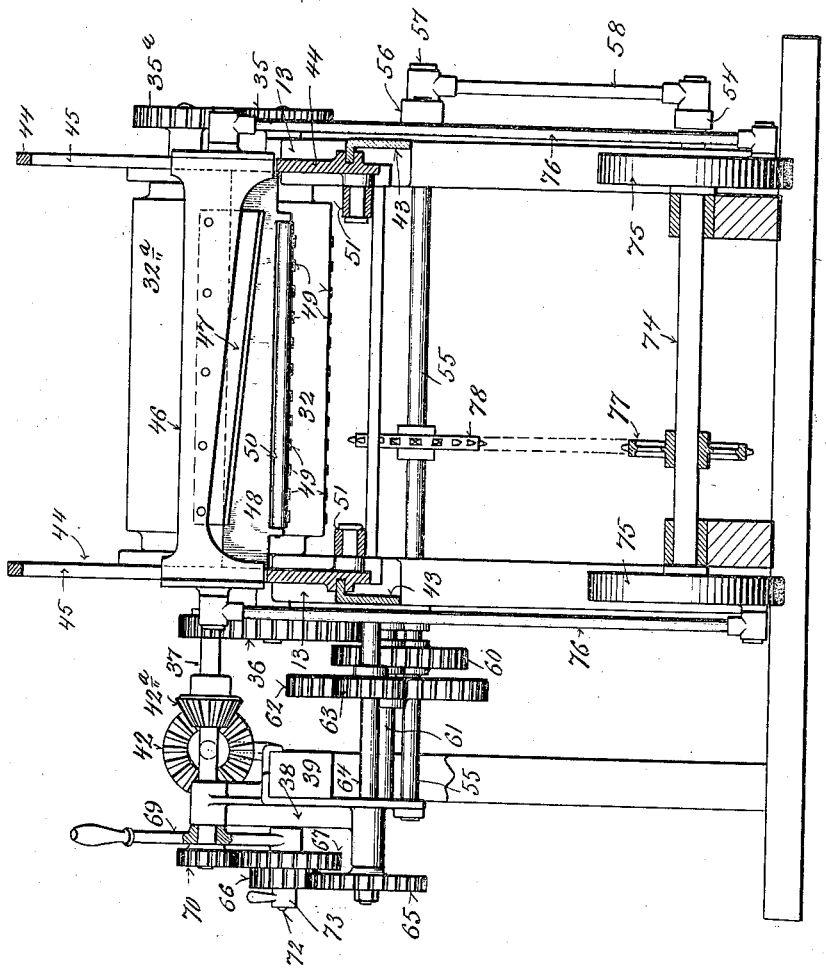

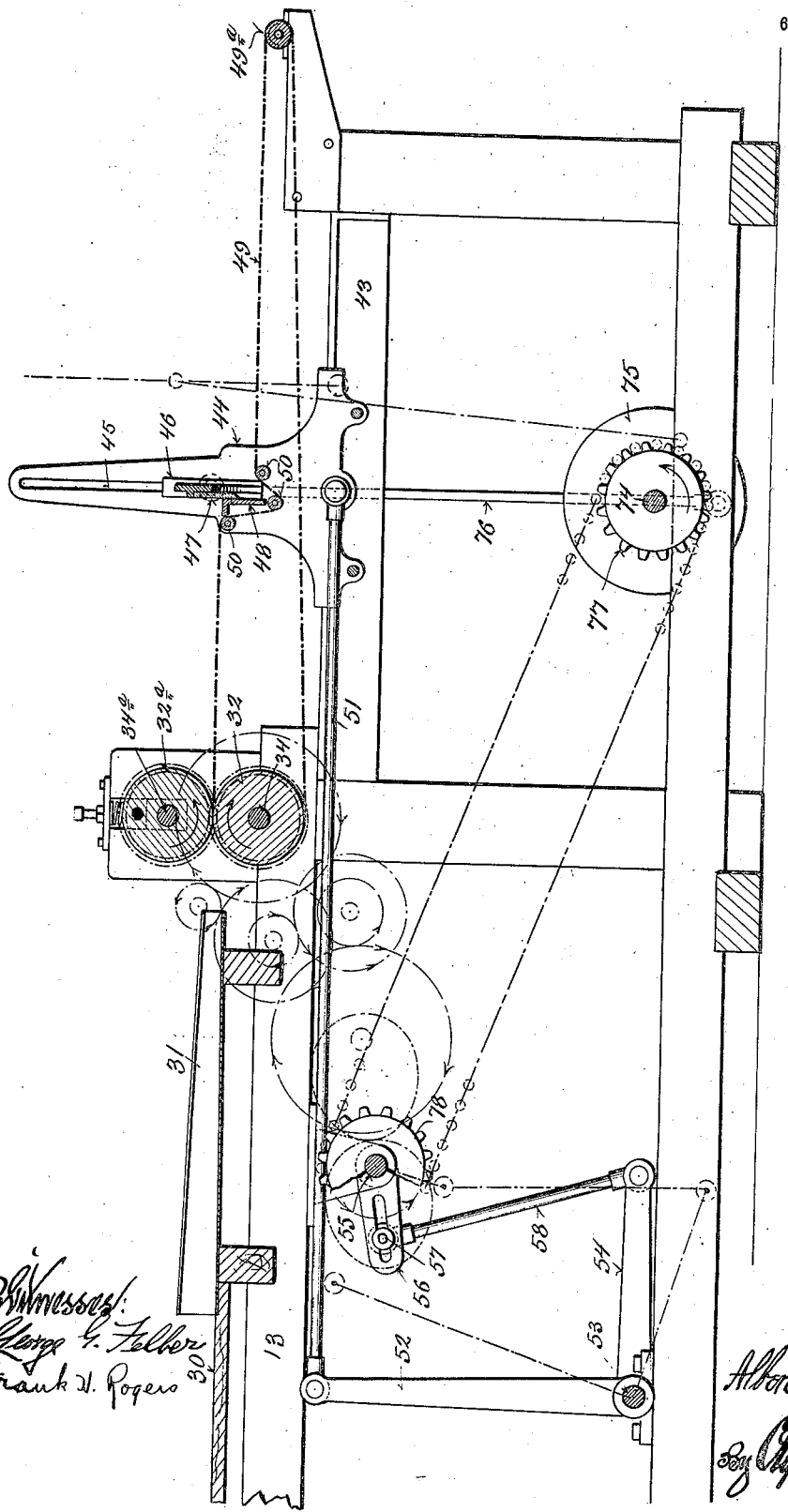

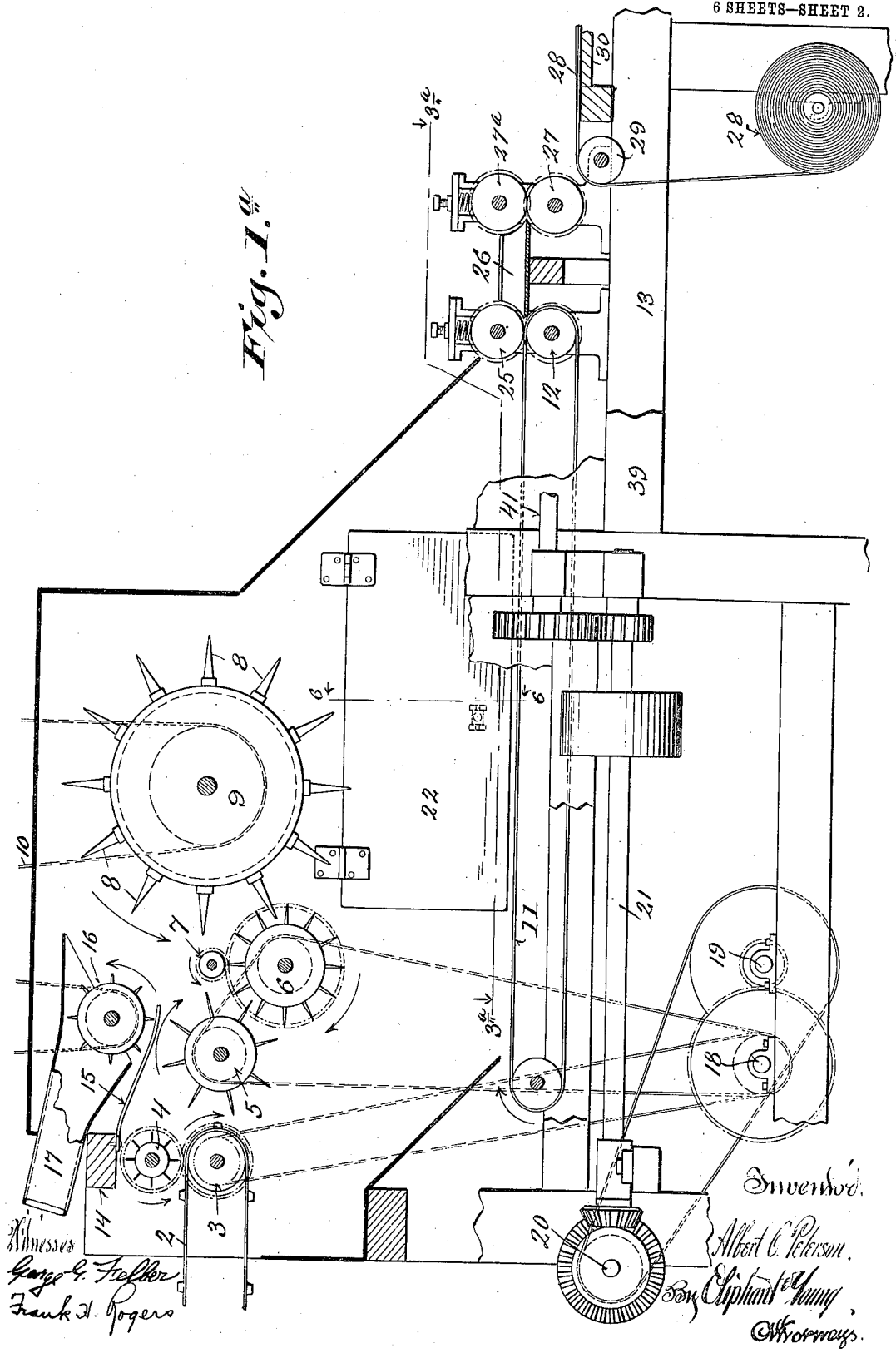

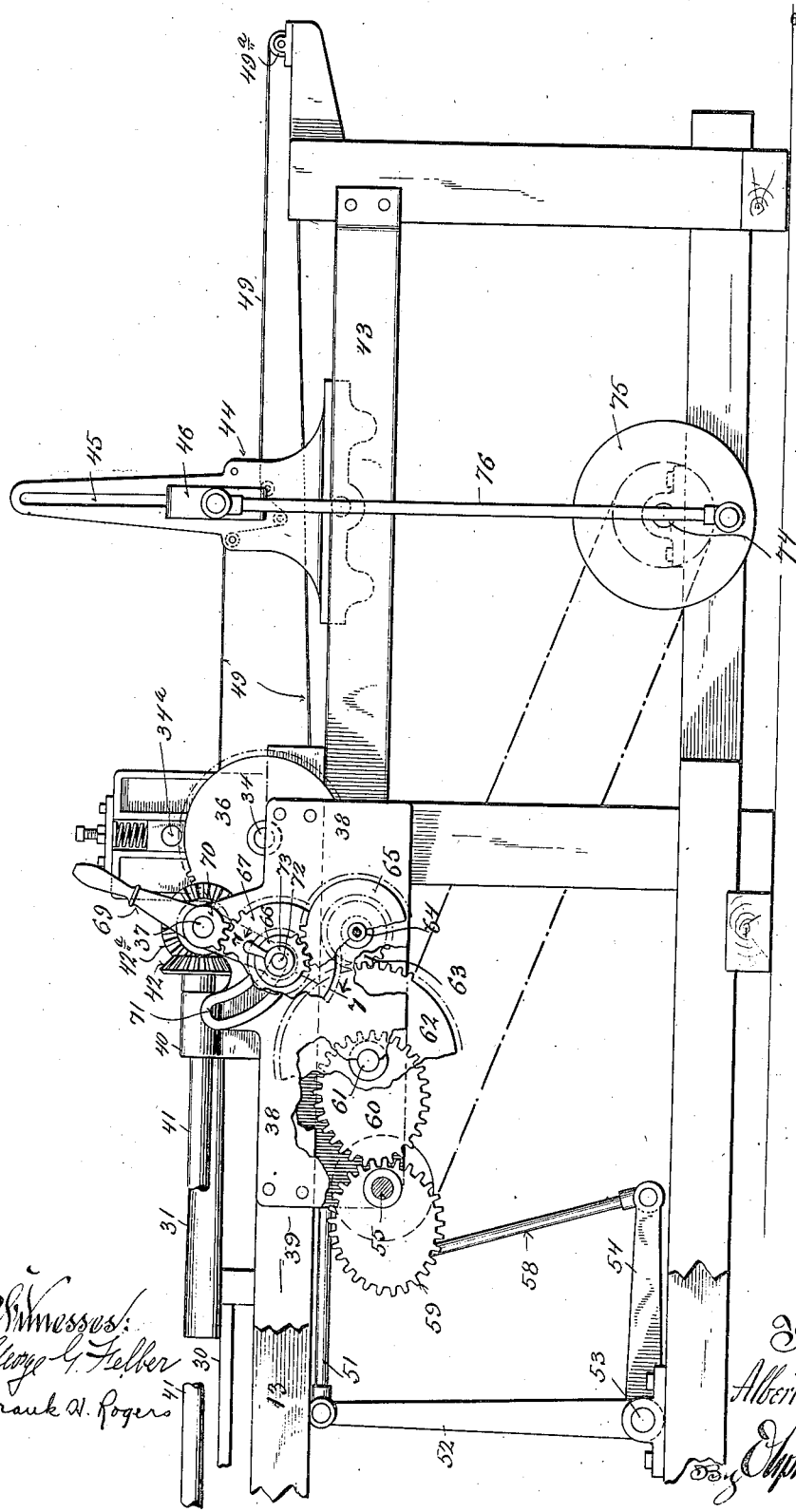

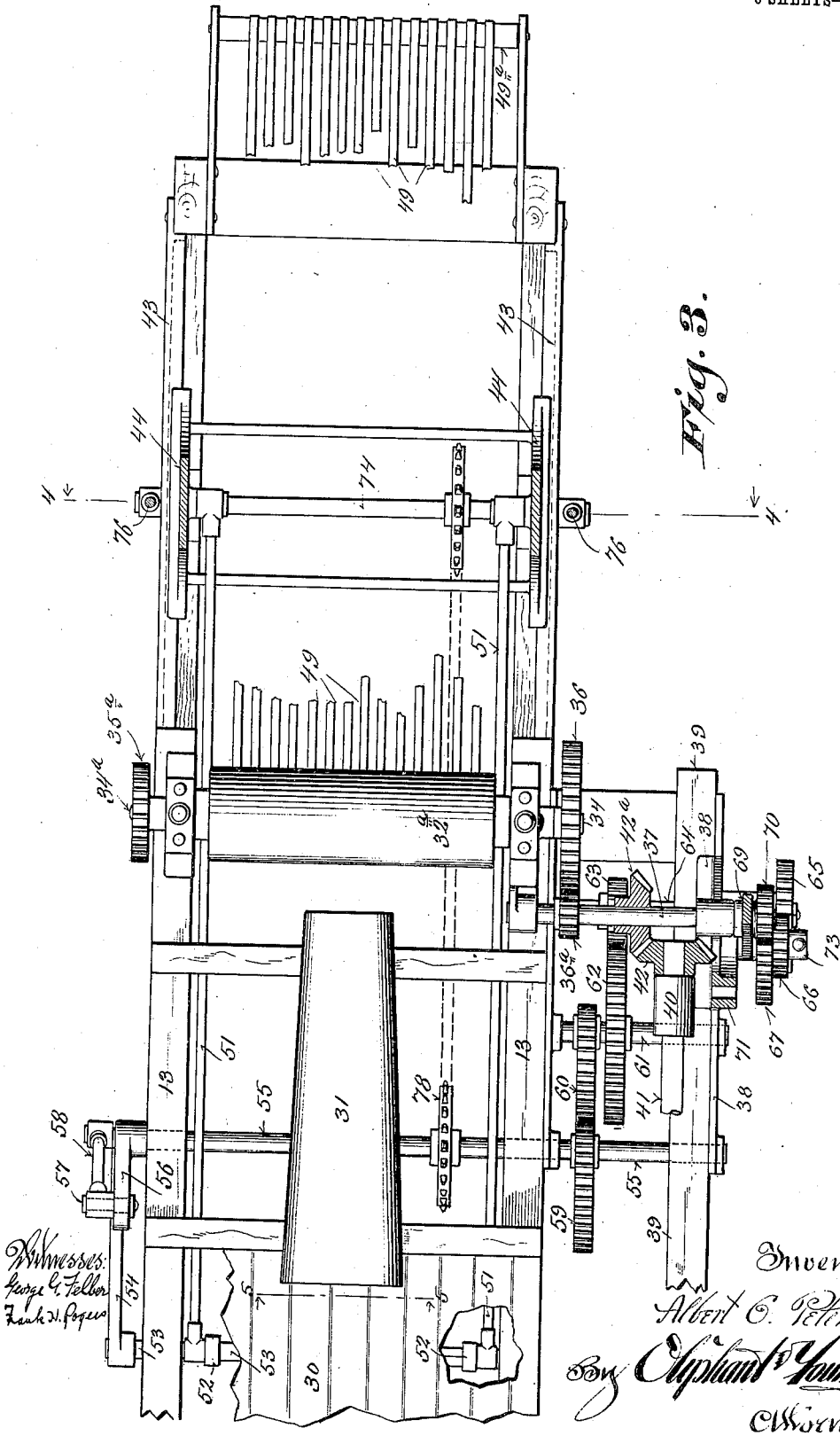

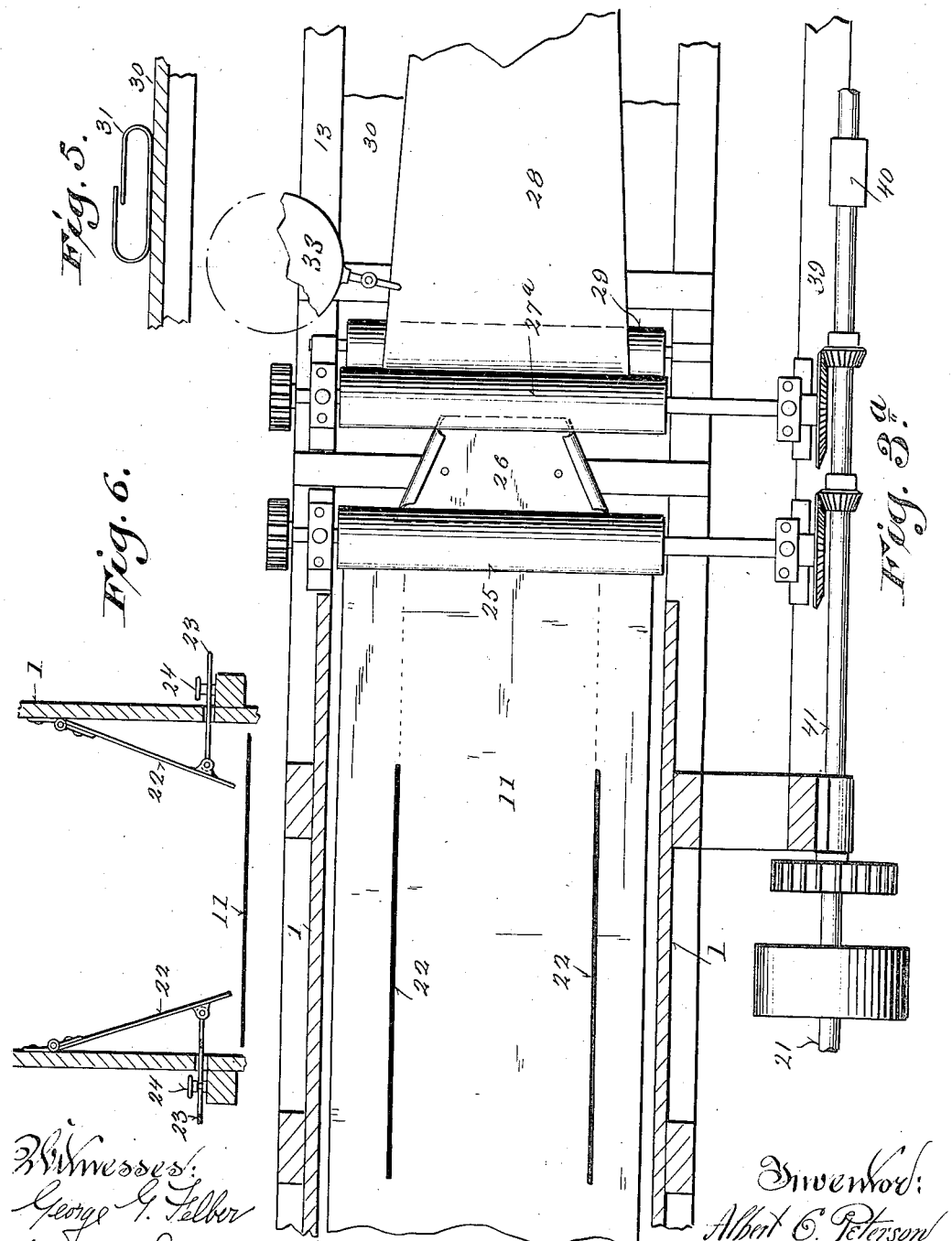

UNITED STATES PATENT OFFICE.

ALBERT C. PETERSON, OF ST. LOUIS, MISSOURI, ASSIGNOR TO HARRY W. SELLE, OF CHICAGO, ILLINOIS.

PACKING-PAD MACHINE.

951,840.  Specification of Letters Patent.  Patented Mar. 15, 1910.

Application filed February 19, 1909. Serial No. 478,817.

*To all whom it may concern:*

Be it known that I, ALBERT C. PETERSON, a citizen of the United States, and resident of St. Louis, State of Missouri, have invented certain new and useful Improvements in Packing-Pad Machines; and I do hereby declare that the following is a full, clear, and exact description thereof.

My invention consists in what is herein described with reference to the accompanying drawings and subsequently claimed, its object being to provide a simple and effective machine for manufacturing packing pads of various predetermined sizes. The construction and arrangement being such that an elastic filling is thoroughly disintegrated by a novel feed-mechanism and deposed in an even layer of predetermined width and thickness upon a paper wrapper strip, which strip is thereafter folded about the filling and sealed. The feed-mechanism described but not claimed in this application is the subject-matter of a separate application applied for concurrently with the present application. The pad thus formed passes between compression rolls which travel at a constant speed, said pad being severed into suitable lengths by a horizontally reciprocative cutting-mechanism, the speed of travel of which mechanism is accelerated over the speed of travel of the pad coincident with the cutting operation, whereby buckling of the pad at the instant of cutting is avoided. Thus the wrapper is fed continuously and all intermittent clutch-mechanism is avoided, by utilizing an elliptical gearing which imparts a continuous variable speed to a vertically reciprocative knife and also its horizontally reciprocative frame.
In the drawings: Figure 1 is a longitudinal sectional view of the forward or cutting end of a pad forming machine embodying the features of my invention; Fig. 1ª, a similar view of the rear feed end of the machine with parts broken away and other parts in full to more clearly illustrate structural features; Fig. 2, a side elevation of the forward end of the machine with parts broken away and parts in section; Fig. 3, a plan view of the same with parts broken away and parts in section; Fig. 3ª, a plan sectional view of the rear end of the machine, the section being indicated by line 3ª—3ª of Fig. 1ª; Fig. 4, a transverse sectional view of the front end of the machine, the section being indicated by line 4—4 of Fig. 3; Fig. 5, a detail cross-section, as indicated by line 5—5 of Fig. 3; Fig. 6, a detail cross-section, as indicated by line 6—6 of Fig. 1ª, showing adjustable wings for controlling the width of filler delivered to the wrapper, and Fig. 7, a detail sectional view of gear-locking mechanism, the section being indicated by line 7—7 of Fig. 2.

Referring by numerals to the drawings, 1 indicates a housing fitted upon a suitable frame structure, and 2 a portion of an endless lagged delivering apron, which is driven and supported by a roller 3 mounted within the housing. Above the roller 3 is located a pin studded roller 4, which roller is in spur-gear connection with the roller 3, the gearing being so proportioned as to impart the same peripheral speed to the pin-studded roller as that of the delivery apron. The filling material is carried by the apron under the pin-studded roller 4 and from thence is delivered to a pin-studded drum 5, from which drum the filler is stripped by a similar pin-studded drum 6, arranged to travel at a greater speed than the former. The filling material caught by drum 6 is passed under a small roller 7 and caught by spurs 8 of a picker-cylinder 9, which cylinder is rotated at a proportionately high speed by a belt 10. The speed of rotation of the cylinder 9 is such that the filling material is thrown off therefrom by centrifugal force and deposited upon an endless conveyer apron 11, which apron is mounted upon a rear idle roller and forward driven roller 12, the latter being mounted in suitable bearing blocks carried by one of a pair of sills 13, which extend from the rear housed portion of the frame.

Extending from a cross-beam 14 above the pin-studded roller 4, are a series of spring tangs 15, only one of which is shown, the free ends of which tangs terminate over the drum 5 at such distance from its periphery as is sufficient to permit a normal thickness of filling material to pass therebetween, the drum and spring tangs together constituting a throat for the reception of said material. Just above the free ends of the tangs 15 is located a toothed stripper drum 16, the ends of its teeth being normally disposed above the line of said tangs, and in such relation thereto that should the normal thickness of filler material be fed, the stripper drum will have no effect thereon. If an increased thickness passes under the tangs however, the same will lift and expose the points of the stripper drum teeth in such manner that said teeth will catch the surplus material and deliver it into the mouth of a funnel 17, it being understood that said stripper drum 16 is rotated at a high speed by means of a suitable driving belt, as shown.

Owing to the speed of the stripper drum, the material is freed from the teeth thereof and forced through the funnel 17, by means of a draft created by the several rotating drums and cylinder within the housing 1, the said surplus filling being deposited back upon the pile or stack of material rearward of the apron. Thus it will be seen that a uniform feed of filling material is automatically maintained without necessitating the employment of variable speed clutches in order to check the flow of said filling, an expedient which is usually necessary in machines of the class to which my invention pertains. The drums 5 and 6 are driven by means of a belt-and-pulley connection from a counter-shaft 18, the apron-roller 3 being also driven in a similar manner from the counter-shaft. The small roller 7 located adjacent to drum 6, is driven at the same peripheral speed as the latter, by means of a pinion, which pinion is in gear-connection with the shaft of said drum 6, as indicated by dotted lines in Fig. 1$^a$. The counter-shaft 18 in turn is back-geared to a shaft 19, which is in belt-and-pulley connection with a similar shaft 20, the latter being driven by bevel gears from a longitudinal power-shaft 21, all of which system of gearing constitutes no part of the invention, and may be varied as to form, in accordance with the speed required for the different rotating parts.

When the filling material is delivered upon the conveyer apron 11, it is caught and deflected thereon between a pair of wings 22, which are hinged to the side walls of the housing, the wings being provided with slotted keepers 23 that are in pivotal connection therewith and extend through apertures in said housing side-walls, at which point the keepers are secured by means of set bolts 24. By this construction the wings may be relatively set so that the filling material falling therebetween can be regulated to any width of layer desired. The driven roller 12 of the carrying apron is in gear-connection with a spring-controlled compression roller 25 located above the same, and between which rollers the filling material passes to a tray 26, this tray being formed with converging side flanges which serve to further contract said layer of filling as it passes to another set of spring-controlled compression rollers 27, 27$^a$, respectively.

Suspended in suitable hangers carried by the machine-frame, is a roll of paper 28, which paper constitutes the wrapper portion of the pads and is located under the compression-rollers 27, 27$^a$. The paper wrapper passes over an idle roller 29 adjacent the before mentioned compression rollers, and from thence over a table 30 to the forward or cutting end of the machine, at which point said wrapper passes through a metallic forming tube 31. This tube as shown is preferably conical in shape with overlapping open edges, such tubes being in common use and constitute no part of the invention. The paper wrapper after leaving the tube is engaged between a pair of spring-pressed driven feed-rollers 32, 32$^a$, which rollers serve to draw the wrapper forward together with the filling deposited thereon from the compression rollers 27, 27$^a$.

As shown in Fig. 3$^a$, a glue-pot 33 is mounted upon the frame having its nozzle so disposed as to feed glue to one edge of the wrapper, and as said wrapper is drawn through the forming tube 31 its glue-coated edge is folded upon the opposite edges thereof with the filling incased therein, the edges being firmly sealed by means of the feed-rollers 32, 32$^a$, as said material passes therebetween to complete the pad, after which the product or stock is severed by the cutting mechanism in desired pad lengths. The feed rollers are rigidly mounted upon shafts 34, 34$^a$, which shafts are mounted in bearing blocks secured to the frame sills 13 and carry spur-gears 35, 35$^a$ arranged to impart motion from the lower feed-roller 32 to the upper feed-roller 32$^a$. One end of the lower feed-roller shaft 34 carries a spur gear-wheel 36, which meshes with a spur-pinion 36$^a$ fast on an arbor 37. The arbor extends beyond the adjacent frame sill 13 and has one of its bearings in a boss of the adjacent feed-roller bearing-block, the opposite bearing being formed in a bracket 38, which bracket is secured to a sill 39 of a supplemental frame that is braced in connection with the main frame of the machine. The sill 39 of the supplemental frame extends from end to end of the machine and is provided with bearings 40 for a longitudinal shaft 41, which is in spur-gear connection with the main drive-shaft 21, as best shown in Fig. 3$^a$. The longitudinal shaft 41 serves to impart motion to both the compression roller 25 and upper compression roller 27$^a$, by means of miter-gears in connection with the shafts of the before mentioned compression rollers and said longitudinal shaft 41, the latter at its forward end being provided with a bevel-gear 42 adapted to mesh with a similar gear 42$^a$ secured to the arbor 37, whereby continuous motion is imparted to the feed-rollers.

The machine-frame is provided with parallel guide-rails 43 forwardly of the feed-rollers 32, 32ª, upon which guide-rails is mounted a horizontally reciprocative knife-frame 44 having vertically disposed ways 45 for the reception of a yoke 46 carrying a shear-blade 47. The shear-blade operates in conjunction with a shear-plate 48 constituting part of the knife-frame, over which shear-plate the pad is fed by means of a series of endless traveling tapes 49 arranged to pass over the feed-roller 32, and an idle roller 49ª mounted in bearings extending from the extreme front end of the machine-frame. The upper stretches of the tapes are guided under the shear-plate 48 by a series of spindles 50, in such manner as to clear the shear-blade, there being a slight drop in the elevation of said upper tape stretches upon the forward side of the latter. Owing to the above described arrangement of tapes, the pad stock is positively fed to the knife irrespective of the position of said knife with relation to the feed-rollers without liability of the stock to sag, and thus vary the cut pad lengths, the said pad lengths being cut and dropped upon the forward depressed portion of the tapes, which portion conveys the same forward and discharges them. The arrangement of spindles 50 also permits free movement back and forth of the knife-frame 44 upon the tapes which maintain their relative kinked position to the shear-plate and blade, whereby a cutting operation may be effected at any distance from the feed-rollers, this distance being determined by the proportions of a gear-train, controlling the time at which the cut is made relative to the feed of the pad stock. The knife-frame 44 is connected by a pair of pitmen 51 to vertically disposed arms 52 carried by a rock-shaft 53, there being a horizontally disposed arm 54 secured to the rock-shaft, which arm in connection with those before mentioned constitutes a bell-crank. A cross-shaft 55 is hung in bearings carried by the frame-sill 13 and an outer bearing of the bracket 38 of the supplemental frame, the cross-shaft being provided with a slotted crank-arm 56 fast to one end thereof. Fitted into the crank-arm slot is an adjustable wrist-pin 57 for the reception of one end of a link 58, which link is connected at its opposite end to the arm 54, whereby motion is imparted to the rock-shaft and through its connection, in turn causes the knife-frame to reciprocate upon its guide-rails.

Power is transmitted to the cross-shaft 55 through a driven elliptical gear-wheel 59 set eccentrically upon said shaft, which gear-wheel meshes with a corresponding driving elliptical gear-wheel 60, that is carried by a spindle 61 trunnioned in bearings depending from the frame-sill 13 and bracket 38. This spindle also carries a gear-wheel 62 that meshes with a pinion 63 secured to a spindle 64 mounted in bearings similar to the spindle just described. Detachably secured to the outer end of spindle 64 is a gear-wheel 65, which gear-wheel is adapted to mesh with a pinion 66 that forms part of a gear-wheel 67, the latter being loosely mounted upon a hollow stud 68 that projects from an arm 69. The arm 69 is fulcrumed upon the arbor 37, which arbor carries a pinion 70 that meshes with the gear-wheel 67, as shown. The bracket 38 is provided with an arc-shaped slot 71, which slot is described upon a radius from the arbor, and is in circumferential alinement with the axis of the hollow stud 68, and into this slot is fitted the shank of a headed bolt 72, which bolt passes through said hollow stud, being threaded for the reception of a hand-nut 73. From the foregoing described gear-train it will be seen that motion is transferred from the arbor 37 to the cross-shaft 55 and then to the cutting mechanism. This arbor also imparts motion to the pad feed-rollers. To change the speed of the cutting-mechanism with relation to the feed-rollers and thereby lengthen or shorten the cut pads, the detachable gear-wheel 65 is replaced by a larger or smaller gear-wheel. The arm 69 is then swung upon its fulcrum so as to bring the pinion of gear-wheel 67 in proper mesh with the substitute detachable gear, and after the nut 73 has been tightened to lock the bolt 72 in position with relation to the arc-shaped slot, the machine is ready for use.

Located midway of the reciprocative stroke of the knife-frame 44 and under the same, is a crank-shaft 74, for which shaft the frame is provided with suitable bearings. This shaft carries a pair of crank disks 75 at its ends, which crank disks are connected to the yoke 46 of the cutting mechanism, by means of pitmen 76, the crank-shaft being driven by a sprocket-wheel 77 in chain-belt connection with a similar sprocket-wheel 78 secured to the cross-shaft 55.

Referring to the position of the parts in Figs. 1 and 2 of the drawings, it will be seen that the cutting-mechanism is midway of its lineal horizontal movement with the gearing moving in the direction as indicated by the arrows. The shaft upon which each elliptical gear revolves is set eccentric to the minor axis of the gear and upon the plane of its major axis. Consequently when the gears are in the relative position, as shown, the maximum radius of the driving elliptical gear 60 is meshed with the minimum radius of the driven elliptical gear 59, which latter gear is accordingly rotating at its highest speed. Thus, for example, while the driving-gear made one-sixteenth of a revolution approaching its major axis, it caused the driven gear 59 to make three-sixteenths of a revolution, which movement in turn caused the knife-frame to move forward to its illustrated central position at a gradually accelerated speed coincident to a quick cutting movement to sever the pad from the stock at this point. The knife-frame continuing forward at a gradually decreasing speed, due to a further movement of one-sixteenth revolution of the driving-gear 60 past its major axis, at which time the shear-blade quickly lifts. By the described movement, it is understood that the cutting mechanism moves forward at a speed so proportioned as to the speed of travel of the pad stock that the shear-blade will cleanly sever the same, but will not cause a draw or tear of the paper and at the same time avoid any tendency of the pad stock to buckle back upon the shear-plate. Upon the return movement of the knife-frame, it is apparent that owing to the elliptical gearing, the movement will be proportionately slower, thus providing for an interval of time sufficient to permit the feed-rollers to discharge another length of pad upon the tapes, the lengths of pad cut being determined by the diameter of the interchangeable gear-wheel 65, which would increase or decrease the number of cutting operations in proportion to the constant speed of said feed-rollers.

It is obvious that any form of spiral or elliptical gearing may be utilized to accomplish the variable speed required in obtaining the desired result, the essential feature being a lineally continuous traveling variable speed cutting mechanism operating in conjunction with a pad stock lineally fed at a constant uniform speed.

I claim:

1. In a pad machine, a pair of feed-rollers for the pad stock, a lineally reciprocative knife-frame, a vertically reciprocative knife-carrying yoke mounted in the frame, a crank-shaft in link-connection with the knife-carrying yoke, actuating arms in connection with said knife-frame, a cross-shaft, a crank arm secured to the cross-shaft in connection with the actuating arms, actuating gears connecting said cross-shaft and crank-shaft, a driving gear for the feed-rollers, an elliptical gear-wheel secured to the aforesaid cross-shaft, and an elliptical gear-wheel in meshed engagement with the cross-shaft elliptical gear-wheel, the last named elliptical gear-wheel being in geared relation with the feed-roller driving-gear.

2. In a pad machine, a pair of feed-rollers for the pad-stock, a lineally reciprocative knife-frame, a vertically reciprocative knife-carrying yoke mounted in the frame, a crank-shaft in link-connection with the knife-carrying yoke, actuating arms in connection with said knife-frame, a cross-shaft, a crank-arm secured to the cross-shaft in connection with the actuating arms, a chain-and-sprocket wheel driving-connection between the cross-shaft and crank-shaft, an elliptical gear-wheel secured to the aforesaid cross-shaft, an elliptical gear-wheel in meshed engagement with the first named elliptical gear-wheel, and a gear-train interposed between the last named elliptical gear-wheel and feed-rollers, whereby the feed-rollers, knife-frame and knife-carrying yoke are actuated in timed relation.

3. In a pad machine, having a frame, a pair of pad-stock feed-rollers mounted thereon, horizontally disposed guides secured to the frame forward of the feed-rollers, a knife-frame mounted upon the guides, a vertically movable knife-carrying yoke mounted in the knife-frame, a crank-shaft, crank-wheels secured thereto, pitmen connecting the crank-wheels and knife-carrying yoke, a rock shaft, vertically disposed arms secured thereto, a horizontally disposed arm secured to the rock-shaft, a cross-shaft, a crank-arm secured thereto, a link connected to the horizontally disposed arm of the rock-shaft, the link being adjustably secured to the cross-shaft crank-arm, a sprocket-wheel secured to said cross-shaft, another sprocket-wheel secured to the crank-shaft, the sprocket-wheels being in link-belt connection, an elliptical gear-wheel secured to the aforesaid cross-shaft, an elliptical gear-wheel in meshed engagement with the first named elliptical gear-wheel, and a gear-train interposed between the last named elliptical gear-wheel and feed-rollers, whereby the feed-rollers, knife-frame and knife-carrying yoke are actuated in timed relation.

4. In a pad machine, having a pair of feed-rollers and an idle roller forward of the same, a knife-frame horizontally reciprocative between the feed-rollers and idle-roller, the knife-frame being provided with a shear-plate, paralleling the axis of said rollers, a reciprocative shear-blade carried by said knife-frame and normally suspended above the shear-blade, and a series of endless tapes connecting the lower feed-roller and idle roller, the upper stretches of the tapes being guided under said shear-plate.

In testimony that I claim the foregoing I have hereunto set my hand at Milwaukee, in the county of Milwaukee and State of Wisconsin in the presence of two witnesses.

ALBERT C. PETERSON.

Witnesses:
GEORGE G. FELBER,
J. C. YOUNG.